United States Patent [19]

Szuhaj et al.

[11] 4,108,678

[45] Aug. 22, 1978

[54] RELEASE AGENT AND METHOD

[75] Inventors: Bernard F. Szuhaj, Lombard; Joseph R. Yaste, Hoffman Estates, both of Ill.

[73] Assignee: Central Soya Company, Inc., Fort Wayne, Ind.

[21] Appl. No.: 758,716

[22] Filed: Jan. 12, 1977

[51] Int. Cl.$^2$ ............................................. C08L 91/00
[52] U.S. Cl. ................................... 106/243; 106/244; 426/608; 426/811
[58] Field of Search ................ 106/243, 244; 426/609, 426/811; 428/467; 260/403

[56] References Cited

U.S. PATENT DOCUMENTS

| 2,402,690 | 6/1946 | Stanley | 260/403 |
|---|---|---|---|
| 2,796,363 | 6/1957 | Lalone | 106/244 |
| 3,661,605 | 5/1972 | Rubin | 106/244 |
| 3,896,975 | 7/1975 | Follmer | 106/244 |
| 3,906,117 | 9/1975 | Gawrilow | 426/811 |

OTHER PUBLICATIONS

Chemistry of Organic Compounds; Carl R. Noller, pp. 177, 209, 1965.

*Primary Examiner*—Theodore Morris
*Attorney, Agent, or Firm*—Tilton, Fallon, Lungmus & Chestnut

[57] ABSTRACT

A release agent employing a lecithin, an alcohol and a mixture of tri-glycol esters.

4 Claims, No Drawings

RELEASE AGENT AND METHOD

BACKGROUND AND SUMMARY OF INVENTION

This invention relates to a release agent and more particularly to a release agent that can be dispensed without the need of an aerosol propellant. The release agent is further characterized as employing a lecithin in combination with an oil base and has both food and industrial usages.

In the past, lecithin has been commercially marketed as a pan release agent and packaged in aerosol containers wherein much of the total product is the propellant/solvent system which evaporates to the atmosphere upon use. Flurocarbons have been the propellant/solvents primarily employed. Considering the possible harmful effects of flurocarbons on the ozone layer, there is a trend away from their usage. Even the other aerosol propellant/solvent such as low molecular weight hydrocarbons with carbon dioxide or nitrous oxide have been considered undesirable because of the possible danger from fire or explosion.

One attempt to avoid all these difficulties has been the development of a water based modified lecithin as found in U.S. Pat. No. 3,928,056. This has proved satisfactory for some usages but is characterized by a somewhat "soapy" flavor resulting from the modified lecithin and therefore does not provide optimum characteristics.

It would therefore be desirable to provide a release agent which could be mechanically dispensed (and therefore eliminate all the problems of the previously employed aerosols) yet one which would be optimal in organoleptic properties (if used for food purposes) as well as being stable. By stability, we refer not only to the resistance of the agent to separate into layers but also its ability to avoid smoke generation when applied to a heated surface. This pertains not only to the food usage as a pan release agent but to industrial usages such as in rubber molds, cutting oils, etc.

Besides the problems of taste and stability, another problem exists with utilizing lecithin in an aerosol-free dispenser — the need for a solvent because of the high viscosity of the lecithin, even when oil based. Even an alcohol solvent (notably ethanol when a food usage is indicated) cannot provide proper solubility for either lecithin or a lecithin-vegetable oil mixture — in particular, the class of vegetable oils known as oleic-linoleic acid oils or triglycerides composed of the triglycerides of predominately 16 to 18 carbon atoms of fatty acids also are not soluble in alcohol. Such vegetable oils of this classification usually include those of the soybean, peanut, cottonseed, safflower and sunflower and which can be used to dilute commercial lecithin. Although lecithin derived from soybeans is preferred, other vegetable sources may be utilized.

We have discovered that the lecithin-vegetable oil and alcohol can be brought into a stable solution system when these ingredients are augmented by other oils or modifications thereof which are generally classified as lauric acid oils where the fatty acids are predominately of the 6 to 12 carbon atom variety. Examples of such oils that exhibit partial or total solubility in alcohol are coconut, cohune, murumru tallow, palm kernel, tucum, ucuhuba tallow as either the glycerol esters or propylene glycol esters of the short chain fatty acids primarily in the range of $C_6$ to $C_{12}$. Also included are fractionated portions of these oils which result in higher $C_6$ to $C_{12}$ fatty acid concentrations and esterified triglycerides and propylene glycol wherein the replacement fatty acids are in the $C_6$ to $C_{12}$ range. These compounds can be used as the mutual solvent to dissolve lecithin, vegetable oils of the oleic acid class, the ethyl alcohol.

As a generic reference for the above identified materials we employ the term tri-glycol ester wherein the fatty acid chains have from 6 to 12 carbon atoms. Also, to refer to the vegetable oil ingredient, we use the same term but designate that the fatty acid chain has from 16 to 18 carbon atoms. For convenience we refer to the lower carbon atom tri-glycols as "lauric" and the higher "oleic".

With the combination of lecithin, alcohol and the two types of tri-glycol esters, we are able to improve taste, avoid separation, optimize viscosity and cost and to elevate the smoke point.

Other objects and advantages of the invention may be seen in the details set forth in the ensuing specification.

DETAILED DESCRIPTION

As an example of one preferred form of the invention, the following example is set down.

EXAMPLE I

As an especially suitable pan release agent, we dissolved 10 grams of oil-free lecithin in 25 grams of a fractionated, reesterified triglyceride of coconut oil by heating to about 160° F. with stirring. The lecithin of this example is commercially available from Central Soya Company, Inc. under the designation CENTROLEX. The triglyceride i.e., the tri-glycol ester having the short carbon chains, is commercially available under the designation NEOBEE M5 from Pacific Vegetable Oil Corporation.

Next, 40 grams of refined, bleached, deodorized soy bean oil was mixed in. At about 90° F., 25 grams of ethyl alcohol was added and mixed well. The resultant product was physically stable, had a viscosity of 72° F. of 14 centipoises, and was readily sprayable with a mechanical hand pump to a fine mist. No trace of smoke was available when sprayed upon a heated surface until the temperature of the surface reached 360° F. Further, no separation was noted when the solution was left standing overnight.

The product of this Example was tested for its release properties in such applications as frying eggs and pancakes, baking of cakes, (including the Bundt type), cookies, cupcakes, corn muffins, to name some of the test applications. The product was found to function very well in releasing the cooked products from the cooking or baking vessel.

Although the mechanism by which the invention operates is imperfectly understood, it is believed that the lower carbon atom tri-glycol ester provides a solubilizing vehicle for the relatively incompatible lecithin-alcohol-vegetable oil ingredients. Therefore, in an attempt to ascertain the optimal relationships in the four ingredient system, a series of tests were performed which are summarized in the next example.

EXAMPLE II

Here the procedure of Example I was followed, maintaining the lecithin concentration at 10% but varying the proportions of the other ingredients with the results being tabulated immediately below.

| % Lauric | % oleic | % EtOH | Visc. | Separ. | Smoke Point |
|---|---|---|---|---|---|
| — | 65 | 25 | 33 | 15/95 | 380 |
| 5 | 65 | 20 | 25 | 5/105 | 400 |
| 10 | 55 | 25 | 23 | 15/90 | 360 |
| 15 | 50 | 25 | 20 | 10/95 | 360 |
| 20 | 45 | 25 | 15 | 10/90 | 360 |
| 30 | 35 | 25 | 13 | None | 360 |
| 30 | 40 | 20 | 17 | None | 360 |

In the foregoing table, the designation under Separation refers to the fact that in the first line, for example, 15 parts separated out of a total of 95 parts when standing overnight. Further, all of the combinations tested had an adequate smoke point which for the purpose of a pan release agent should be above about 340° F. With food being cooked, the temperature ordinarily does not reach this level.

In view of the fact that the higher fatty acid chain tri-glycol esters, i.e., those characterized as "oleic" above are cheaper, add lubricity, and also serve to elevate the smoke point, a further investigation was made utilizing high levels of the longer chain ester but in combination with a different short chain triglyceride, and the results are set forth in Example III.

EXAMPLE III

In this example, the procedure of Example I was again followed relative to the process steps but instead of dissolving 10 grams of lecithin in NEOBEE M5, NEOBEE M20 — a different fractionation — was employed. The results of combining the lecithin oleic ingredient with the vegetable oil and alcohol are as follows.

| % lauric | % oleic | % EtOH | Visc. | Separ. | Smoke Point |
|---|---|---|---|---|---|
| 15 | 50 | 25 | 12 | 5/100 | 275 |
| 10 | 55 | 25 | 18 | 7/98 | 300 |
| 5 | 65 | 20 | 23 | 10/95 | 320 |

From the foregoing, it appears that the higher percentages of the longer chain tri-glycol esters are not as advantageous in avoiding separation. However, in those instances where separation is tolerable, the more expensive lauric ingredient can be reduced. In a pan release agent, for example, separation could be tolerated if the housewife were willing to shake the container before dispensing the same. However, optimum formulations are those where the ingredients do not separate into discrete layers upon standing.

A further investigation of the concentration relationships was undertaken with the results set forth in the example below.

EXAMPLE IV

Here the percentage of lecithin was changed as well as the relative proportions of the other three ingredients, the procedure of preparation however following that of Example I. The results are tabulated below.

| % lecithin | % lauric | % oleic | % EtOH | Visc. | Separ. | Smoke Point |
|---|---|---|---|---|---|---|
| 8 | 8 | 65 | 19 | 21 | 5/100 | 300 |
| 8.1 | 8.1 | 65.0 | 19.2 | 15 | 3/100 | 380 |
| 8.4 | 8.4 | 68.0 | 15.0 | 24 | — | — |
| 9.0 | 9.0 | 7.2 | 10.4 | 31 | — | — |
| 23.8 | 47.5 | — | 28.6 | 11 | None | 350 |
| 23.8 | 23.8 | 23.8 | 28.6 | 15 | None | 350 |

In all of the runs of the foregoing table, NEOBEE M5 was employed with the exception of the first listed run wherein NEOBEE M20 was employed. As far as the alcohol ingredient is concerned, the preferred range is 20 to 25% to achieve optimum solubility and viscosity. As the proportion of lecithin is reduced below 10%, less satisfactory results are obtained although an operable range is from about 5% to about 30%. The upper portions of the range are probably less desirable from an economic standpoint because of the cost of the lecithin. As far as the shorter chain tri-glycol ester is concerned, we prefer to employ from about 10% to about 30% and relative to the longer chain tri-glycol ester an amount in the range of about 20% to about 40%.

Although, in the foregoing examples we have employed oil free lecithin (normally defined as containing less than about 3% oil) it is possible to employ commercial lecithin which is made up essentially of 60% phosphatides and 40% oil and dilute the same with additional oil to reach the desired relationship. For example, the optimum formulation of Example I contains 10% phosphide and 40% soybean oil, i.e., the longer chain tri-glycol ester.

Additionally, where the intended usage is non-food, i.e., industrial, it is possible to utilize other alcohol substitutes such as methanol, n-propyl alcohol, iso-propyl alcohol or hexane.

While in the foregoing specification a detailed description of the invention has been set down for the purpose of illustration, many variations in the details hereingiven may be made by those skilled in the art without departing from the spirit and scope of the invention.

We claim:

1. A method of preparing a sprayable pan release product comprising mixing lecithin and a tri-glycol ester having fatty acid chains of from 6 to 12 carbon atoms at a temperature sufficient to form a solution thereof, cooling the mixture to about 90° F., adding thereto an alcohol, said alcohol being present in an amount of about 20% to about 25% of the weight of said product, said lecithin being present in the range of about 5% to about 30% with the remainder being a member selected from the class consisting of said tri-glycol ester and a mixture of said tri-glycol ester and a second tri-glycol ester having fatty acid chains of from 16 to 18 carbon atoms, and thereafter placing the mixture in a mechanical dispensing container whereby dispensing is achieved without the use of an aerosol propellant.

2. The method of claim 1 in which said lecithin is derived from soybeans and contains less than 3% soybean oil.

3. The method of claim 1 in which said lecithin contains about 40% soybean oil.

4. The method of claim 3 in which a second tri-glycol ester having fatty acid chains of from 16 to 18 carbon atoms is added subsequent to the addition of the first mentioned tri-glycol ester.

* * * * *